(12) United States Patent
Morin et al.

(10) Patent No.: US 11,860,715 B2
(45) Date of Patent: Jan. 2, 2024

(54) MESSAGING FOR ODATA ERROR TARGETS

(71) Applicant: SAP SE, Walldorf (DE)

(72) Inventors: Arley Triana Morin, Walldorf (DE); Ralf Handl, Heidelberg (DE)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 17/453,896

(22) Filed: Nov. 8, 2021

(65) Prior Publication Data
US 2023/0144551 A1  May 11, 2023

(51) Int. Cl.
*G06F 11/07* (2006.01)
*H04L 67/02* (2022.01)
*G06F 40/226* (2020.01)
*G06F 40/174* (2020.01)

(52) U.S. Cl.
CPC ...... *G06F 11/0769* (2013.01); *G06F 11/0709* (2013.01); *G06F 40/174* (2020.01); *G06F 40/226* (2020.01); *H04L 67/02* (2013.01)

(58) Field of Classification Search
CPC ............ G06F 11/0769; G06F 11/0709; G06F 40/174; G06F 40/226; H04L 67/02
See application file for complete search history.

(56) References Cited

U.S. PATENT DOCUMENTS

| | | | | |
|---|---|---|---|---|
| 4,646,250 A * | 2/1987 | Childress | ............. | G06F 40/174 715/255 |
| 5,732,219 A * | 3/1998 | Blumer | ................ | G06F 40/166 709/227 |
| 6,915,454 B1 * | 7/2005 | Moore | ................ | G06F 11/0709 717/124 |
| 9,176,801 B2 * | 11/2015 | Baeuerle | ............. | G06F 16/2365 |
| 9,424,243 B1 * | 8/2016 | Thiruvasagam | ...... | G06F 40/174 |
| 2002/0095406 A1 * | 7/2002 | McGeorge, Jr. | ...... | G06F 40/226 |
| 2003/0078949 A1 * | 4/2003 | Scholz | ................. | G06F 40/174 715/234 |
| 2003/0217162 A1 * | 11/2003 | Fu | .......................... | H04L 67/02 709/229 |
| 2004/0024842 A1 * | 2/2004 | Witt | ....................... | H04L 67/02 709/219 |

(Continued)

FOREIGN PATENT DOCUMENTS

CA  2998049 A1 *  9/2018  ......... H04L 63/0209

*Primary Examiner* — Shahid K Khan
(74) *Attorney, Agent, or Firm* — Buckley, Maschoff & Talwalkar LLC (57) ABSTRACT

Provided are systems and methods which provide an OData messaging protocol for HTTP messages that are processed successfully but with some errors. In one example, the method may include transmitting a HTTP request to an OData service, the HTTP request comprising identifiers of one or more input fields and one or more values for the one or more input fields, receiving, from the OData service, an HTTP response indicating that the HTTP request was processed successfully with one or more errors, identifying an input field which is a target of the error and a reason for the error from a field in the HTTP response indicating that the HTTP request was processed successfully with one or more errors, and rendering, via the application, a visual identifier of the error in association with a display of the input field on the user interface.

20 Claims, 9 Drawing Sheets

(56) References Cited

U.S. PATENT DOCUMENTS

| | | | | |
|---|---|---|---|---|
| 2013/0282703 A1* | 10/2013 | Puterman-Sobe | ...... | H04L 67/51 707/E17.084 |
| 2014/0372367 A1* | 12/2014 | McLean | ................ | H04L 63/083 707/603 |
| 2015/0074069 A1* | 3/2015 | Baeuerle | ........... | G06F 16/24565 707/702 |
| 2015/0074081 A1* | 3/2015 | Falter | .................. | G06F 16/2433 707/713 |
| 2015/0074083 A1* | 3/2015 | Hutzel | ................ | G06F 16/2445 707/716 |
| 2015/0149445 A1* | 5/2015 | Foebel | .................... | H04L 67/02 707/722 |
| 2016/0019295 A1* | 1/2016 | Makris | .................. | G06F 16/951 707/770 |
| 2016/0132552 A1* | 5/2016 | Xue | .................... | G06F 16/2423 707/766 |
| 2016/0308974 A1* | 10/2016 | Chadzelek | ............ | H04L 67/025 |
| 2017/0075902 A1* | 3/2017 | Hoffner | ................. | G06F 16/252 |
| 2017/0147424 A1* | 5/2017 | Geiger | ................ | G06F 11/0706 |
| 2017/0168854 A1* | 6/2017 | Rao | ......................... | G06F 8/315 |
| 2017/0300402 A1* | 10/2017 | Hoffner | ............... | G06F 11/3684 |
| 2017/0324719 A1* | 11/2017 | Mason | .................. | H04L 63/108 |
| 2018/0173477 A1* | 6/2018 | Porwal | .................. | G06F 3/1287 |
| 2018/0307692 A1* | 10/2018 | Yuan | ..................... | G06F 16/252 |
| 2018/0367605 A1* | 12/2018 | Maity | ..................... | H04L 67/02 |
| 2019/0212881 A1* | 7/2019 | Rommel | ............... | G06F 3/0482 |
| 2020/0195687 A1* | 6/2020 | Johns | .................... | G06F 21/563 |

\* cited by examiner

HTTP Response Header

--batch_id-16311067453-381
content-type: application/http
content-transfer-encoding: binary

HTTP/1.1 200 OK —— 162
odata-version: 4.0
content-type: application/json;odata.metadata=minimal;IEEE754compatible=true {"@odata.context":"..$metadata#Products/$entity","ID":"7be6d", "identifier":"AR-FGB-1013","name":"13-Pock—
batch_id-16311067453-381
content-type: application/http
content-transfer-encoding: binary
⎯⎯ 164

HTTP/1.1 400 Bad Request —— 166
odata-version: 4.0
content-type: application/json;odata.metadata=minimal;IEEE754compatible=true {"error":{"code":"400","message":"Assign a category","target":"in/category_ID","@Common.numericSeverity":4}}  —— 168
--batch_id-16311067453-381--

HTTP Post Request

```
                                                         310
Post/Header

{
  "ID": 1,                          312
  "items": [{
      "item_identifier": "CategoryID0123",
      "description": null
  }]
}                    314
```

FIG. 3B

HTTP Error Response

```
                                                         320
//Response Header {                           322
  "code": 400,
  "message": "Value is required",
  "target": "items(item_identifier=CategoryID0123)/description",
}
   324
```

FIG. 3C                330

General   Reviews   Product Details

Split Air Conditioning Unit

Price
$5,499.00

Weight
45

Unit
lb

Product ID *
AR-FB-1008-09A

Supplier
Air Conditioning Supplier Inc.

Product Description
Mini A/C unit which can be installed in a ceiling above the area to be cooled.

Category *    (X) Value is Required — 334

[empty dropdown] — 332

☐ Preferred Product?

( Save )   ( Post )   ( Cancel )

MESSAGING FOR ODATA ERROR TARGETS

BACKGROUND

Open Data Protocol ("OData") is an approved standard that defines a best set of practices for building and consuming representational state transfer (REST) application programming interfaces (APIs). REST is a framework that defines how to send messages between two different systems using hypertext transfer protocol (HTTP). For example, a database may be accessed (and data retrieved) by querying a REST API. OData builds on top of the REST framework to define the best practices for building REST APIs including the HTTP message format for querying the REST APIs. In a host environment, applications and/or other software programs may access one or more REST APIs via one or more OData services.

When processing an OData request (e.g., an HTTP request) at a server, there are three basic outcomes. The first outcome is that the request may be processed successfully. The second outcome is that the request may not be processed at all because of errors. The third type of outcome is when the data was processed successfully, but there were also errors. OData defines a way to tell an end user what went wrong when the second outcome occurs (i.e., nothing is processed successfully). However, OData does not define a way to tell a user what went wrong when part of the request was processed successfully, while another part of the request was not processed successfully.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

HTTP-based application, such as those using SAP Fiori, send OData requests to the backend system as HTTP requests. When there is an error that still allows the request to be processed, but something goes wrong, the OData service has no way to inform the HTTP-based application of such issues. For example, a user may have an invalid input in one field, but a valid input in another field. Thus, the valid input can be processed successfully, but the invalid input cannot be processed successfully. In this scenario, the OData service is able to process part of the request successfully, while unsuccessfully processing the other part of the request. However, prior to the example embodiments, the OData service was unable to provide notice of the unsuccessful part of the request to the application or why.

In the example embodiments, HTTP messages are how data is exchanged between a client application and an OData service (or host application of the OData service) which the client application desires to access data from. There are two types of messages: requests sent by the client application to trigger an action by the OData service, and responses, the answer from the OData service. HTTP messages are composed of textual information encoded in ASCII, and span over multiple lines. In HTTP/1.1, and earlier versions of the protocol, these messages were openly sent across the connection. In HTTP/2, the once human-readable message is now divided up into HTTP frames, providing optimization and performance improvements. Web developers, or webmasters, may craft these textual HTTP messages themselves. As another example, software, a Web browser, proxy, or Web server, and the like, may generate HTTP messages. For example, these entities may provide HTTP messages through config files (e.g., for proxies or servers), APIs (e.g., for browsers), or other interfaces.

HTTP requests, and responses, share similar structure and may include (i) a start-line (e.g., a single line in the message) describing the requests to be implemented, or its status of whether successful or a failure (ii) an optional set of HTTP headers specifying the request, or describing the body included in the message, (iii) a blank line indicating all meta-information for the request has been sent, (iv) an optional body containing data associated with the request (like content of an HTML form), or the document associated with a response, and the like. The presence of the body and its size is specified by the start-line and HTTP headers. In some embodiments, the start-line and HTTP headers of the HTTP message are collectively know as the head of the requests, whereas its payload is known as the body.

In the example embodiments, a new type of message is designed which provides an HTTP response from the OData service which includes an HTTP response header that specifies the field where the error is located (i.e., the target field), and a human-readable error message with text content to be displayed by the application. Thus, the HTTP application can display additional information to the user that was not previously capable of being provided. The HTTP response message from the OData service provides a "target" of the error. Although the examples herein refer to "error" messages being transmitted from an OData service to an HTTP-based application, it should also be appreciated that the HTTP messages according to various embodiments may carry other types of content besides error indications. For example, an OData service may send a warning message to the application if a problem or inconsistency has arisen, a success message when an action has been performed without errors, an information message if non-critical information is being provided to the application, a confirmation message which prompts a user of the application to confirm an action before it is executed, and the like.

Cloud services and other support packages and suites offered by host platforms may provide for a generic way to significantly shorten the service development time by providing out-of-the-box solutions for software applications running on the host platform and interacting with the underlying services, such as OData. This allows developers to focus on the specific business logic of the application thus reducing the overall time for development. Examples of out of the box solutions for recurrent tasks include automatically servicing of CRUD requests for a particular data model. CRUD includes commit, read, update, and delete operations. These capabilities allow an application to fetch/run services quickly by just composing model entity definitions and running simple common line interface that you can run at your terminal that automatically creates all of these services and do the deployment and start a server to handling of the requests.

Meanwhile, OData is an open protocol designed to work with all types of platforms. OData provides predefined messaging for HTTP requests and HTTP responses that are to be adhered to by applications when interacting with an OData service. However, OData does not currently define a messaging protocol for when an HTTP request was processed successfully but with some errors or other issues. For example, suppose that a user enters some data into a first field but leaves a mandatory field blank, and then tries to store/save the data to the backend. In that scenario, the data in the first field will be saved but the null value (blank) in the mandatory field will create an issue. The example embodiments provide a messaging protocol that makes it possible for the OData service to communicate both the success and the errors to the application as well as an identifier of a target of the error as well as a reason (description) for the error. In response, the application can identify the user interface element (text box, checkbox, button, etc.) that is associated with the error and display a visual identifier of the error on the user interface in association with the user interface element.

REST-based OData services enable applications to share data with a wide range of devices, technologies, and platforms in a way that is easy to understand and consume. REST services provides for various advantages including obtaining human readable results that can be visualized within a web browser, use of stateless applications, receipt of related pieces of information, and the use of standard commands such as GET, PUT, POST, DELETE, and QUERY. OData enables the creation of REST-based data services which allow resources, identified using Uniform Resource Locators (URLs) and defined in a data model, to be published and edited by Web clients using simple HTTP messages. This specification defines the core semantics and the behavioral aspects of the protocol.

OData includes a Web protocol for querying and updating data, applying and building on web technologies such as HTTP, Atom Publishing Protocol (AtomPub), and RSS (Really Simple Syndication) to provide access to information from a variety of applications. It is easy to understand and extensible, and provides consumers with a predictable interface for querying a variety of data sources. OData provides additional features as well, such as feed customization that allows mapping part of the structured content into the standard Atom elements, and the ability to link data entities within an OData service (via " . . . related . . . " links) and beyond (via media link entries). OData is also extensible, like the underlying AtomPub, and thereby allows the addition of features that are required when building easy-to-use applications, both mobile and browser-based.

The OData Protocol is different from other REST-based web service approaches in that it provides a uniform way to describe both the data and the data model. This improves semantic interoperability between systems and allows an ecosystem to emerge. Towards that end, the OData Protocol follows design principles including mechanisms that work on a variety of data sources, do not assume a relational data model, support extended functionality without breaking clients unaware of those extensions, and follow REST principles.

An OData metadata document is a representation of a service's data model exposed for client consumption. In various host environments, the host may provide its own metadata document for applications to consume. Here, the metadata document may include the data model for use with the OData services offered by the host platform or otherwise available via the host platform. Thus, applications can consume the metadata document and understand the identifiers, codes, types, etc., to use when messaging with the OData services.

The central concepts in the metadata document are entities, relationships, entity sets, actions, and functions. Entities are instances of entity types (e.g. Customer, Employee, etc.). Entity types are named structured types with a key. They define the named properties and relationships of an entity. Entity types may derive by single inheritance from other entity types. The key of an entity type is formed from a subset of the primitive properties (e.g., Customer ID, Order ID, Line ID, etc.) of the entity type. Complex types are keyless named structured types consisting of a set of properties. These are value types whose instances cannot be referenced outside of their containing entity. Complex types are commonly used as property values in an entity or as parameters to operations. Properties declared as part of a structured type's definition are called declared properties. Instances of structured types may contain additional undeclared dynamic properties. A dynamic property cannot have the same name as a declared property. Entity or complex types which allow clients to persist additional undeclared properties are called open types.

Relationships from one entity to another are represented as navigation properties. Navigation properties are generally defined as part of an entity type, but can also appear on entity instances as undeclared dynamic navigation properties. Each relationship has a cardinality. Enumeration types are named primitive types whose values are named constants with underlying integer values. Type definitions are named primitive types with fixed facet values such as maximum length or precision. Type definitions can be used in place of primitive typed properties, for example, within property definitions. Entity sets are named collections of entities (e.g. Customers is an entity set containing Customer entities). An entity's key uniquely identifies the entity within an entity set. If multiple entity sets use the same entity type, the same combination of key values can appear in more than one entity set and identifies different entities, one per entity set where this key combination appears. Each of these entities has a different entity-id. Entity sets provide entry points into the data model.

Operations allow the execution of custom logic on parts of a data model. Functions are operations that do not have side effects and may support further composition, for example, with additional filter operations, functions or an action. Actions are operations that allow side effects, such as data modification, and cannot be further composed in order to avoid non-deterministic behavior. Actions and functions are either bound to a type, enabling them to be called as members of an instance of that type, or unbound, in which case they are called as static operations. Action imports and function imports enable unbound actions and functions to be called from the service root. Singletons are named entities which can be accessed as direct children of the entity container. A singleton may also be a member of an entity set. An OData resource is anything in the model that can be addressed (an entity set, entity, property, or operation).

Every OData service may have a different set of entities and a different set of fields for a user interface. According to various embodiments, a software application can discover the OData service information when it is deployed on the host platform. For example, data models may be defined by the runtime environment of the host platform. The data modeling may include predefined names, identifiers, content types, table identifiers, constraints, etc., for various user interface elements (e.g., text boxes, radio buttons, checkboxes, etc.) that are displayed via a user interface of the application and used for interacting with data provided by an OData service. When the application is deployed on the host platform, the application may be integrated with metadata of the runtime environment which includes the data models for the user interface elements. For example, a metadata document including the data modeling may be compiled with the application. Thus, the application is able to communicate with the OData service about the user interface elements (input fields) that are receiving inputs via the user interface and the values that are being provided as the inputs (or in some cases, null).

The targets will be different for each service. The example embodiments provide a way to express these targets in a generic way that can be used with every OData service even though the OData service may have different structures. That is, by reading in the metadata of the OData service information (UI element information) at deployment time, the application will have an understanding of the unique identifiers of UI elements that are used by the OData service thereby enabling the application to send identifiers of such UI elements to the OData service and also receive information about such UI elements in response from the OData service. Thus, the OData service can identify a target of an error by its identifier, along with a human-readable description of the error. This information can be added to the HTTP response (e.g., in a separate field newly provided by the example embodiments). The HTTP response includes the target that needs the error message and the error message content to be displayed. The backend knows which field has an invalid value, and this field is the problem (in the response).

Figure 1A:
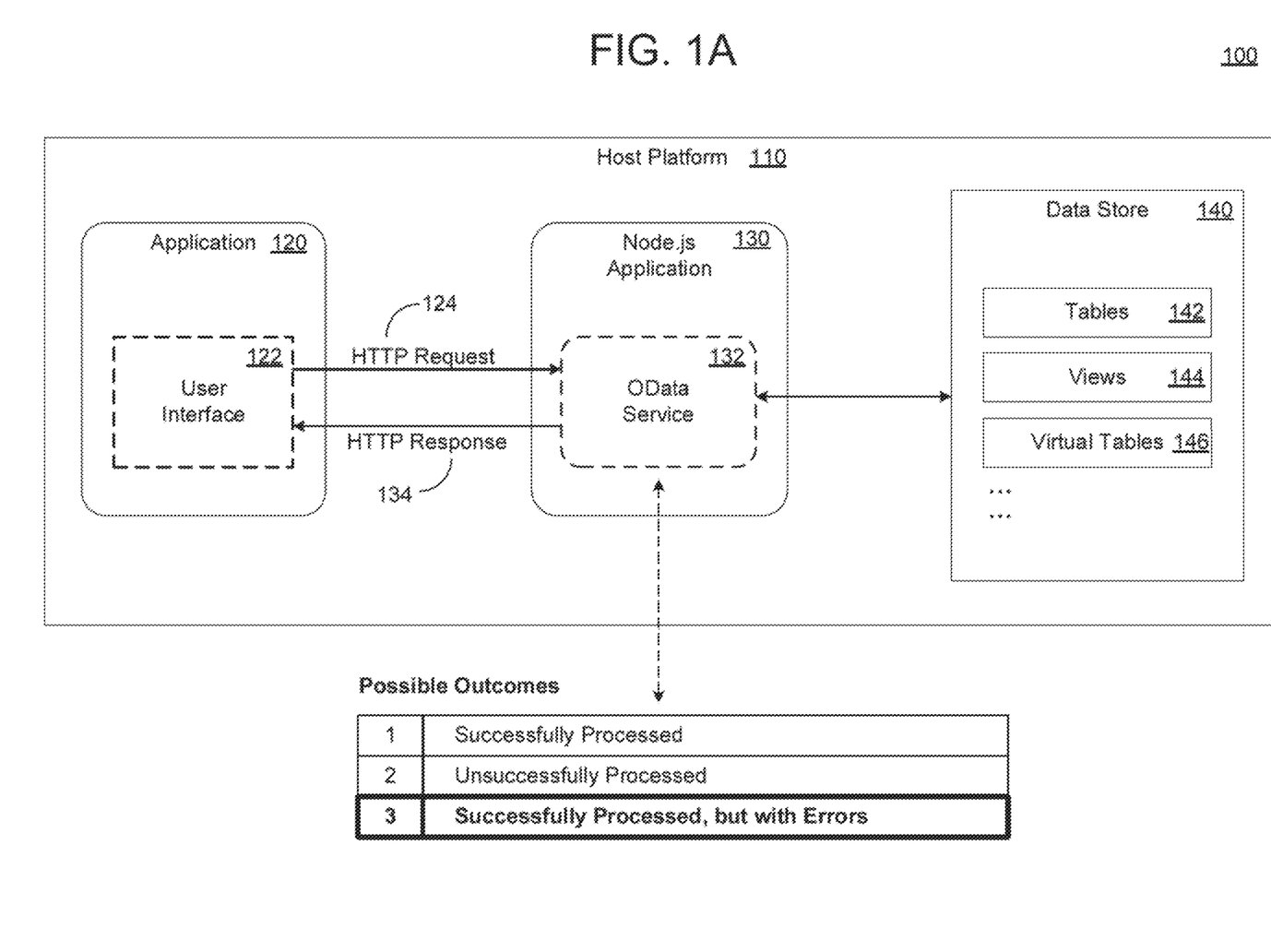
FIG. 1A is a diagram illustrating an example of a computing environment for OData services in accordance with an example embodiment.

FIG. 1A illustrates a computing environment 100 for OData services in accordance with an example embodiment. Referring to FIG. 1A, an application 120 (e.g., a software application, service, program, etc.) may be deployed on a host platform 110 where it is able to interact with data stored in a data store 140, such as a database, via one or more OData services. In the example of FIG. 1A, an application 130 hosts an OData service 132 for accessing data associated with the application 120 from the data store 140. The data store 140 may include tables 142 of data in row/column format, views 144 which define how the data is to be visualized, virtual tables 146, and the like.

A user may interact with a user interface 122 output by the application 120. For example, the user may enter data into one or more input fields of the user interface 122 and attempt to submit the data to the data store 140 by pressing on a button or some other mechanism on the user interface 122. In response, the application 120 may generate an HTTP request 124 with identifiers of the one or more input fields and data values to be stored in the one or more input fields. Here, the data values may include express values that are input (e.g., text, button selections, etc.). As another example, the data values may be include a null value indicating that the text box, radio button, etc. has been left empty or unchecked. The application 120 may send the HTTP request 124 to the OData service 132. Here, the OData service 132 may process the HTTP request 124 against the data stored in the data store 140. For example, any of the CRUD operations (create, read, update, delete) may be performed.

In this case there are three possible scenarios for the data processing of the HTTP request 124 by the OData service 132 including successfully processed, unsuccessfully processed, and successfully processed but with errors. OData defines the content of the HTTP response message from the OData service 132 for the first two outcomes (complete success and completely unsuccessful). But OData does not define how to communicate errors when part of the request was processed successfully but another part was not processed successfully.

Figure 1B:
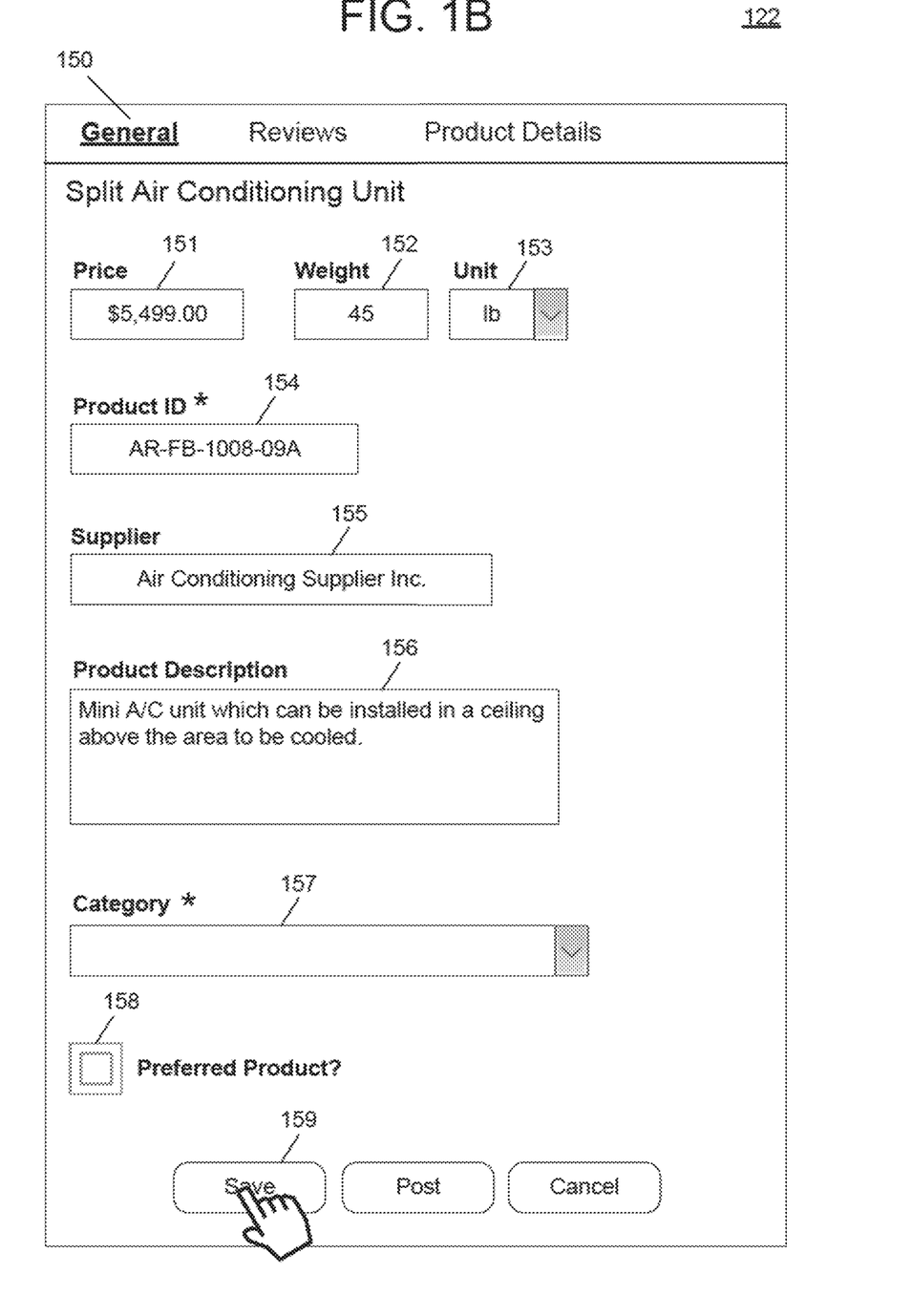
FIG. 1B is a diagram illustrating a user interface of an application that interacts with an OData service in accordance with an example embodiment.

FIG. 1B illustrates the user interface 122 of the application 120 that interacts with the OData service 132 shown in FIG. 1A, in accordance with an example embodiment. In this example, the user has navigated to a page of the application which corresponds to a Split Air Conditioning Unit. The user has chosen a general tab on a user interface 150 and may enter content into any of the one or more of the input fields 151, 152, 153, 154, 155, 156, 157, and 158. The input fields may refer to text box inputs, checkboxes, drop-down menus, radio buttons, menus, and the like. In some embodiments, the input fields may be referred to herein as UI elements or UI controls.

In the example of FIG. 1B, mandatory fields are noted with an asterisk. In this example the Product ID input field 154 and Category input field 157 are mandatory fields which must be filled-in for the record to be valid with respect to the business logic of the application 120. Here, a user has entered data into some of the fields, but the user has left the Category input field 157 empty. Here, the user goes to save the inputs by pressing on a save button 159. In this case, by pressing on the save button 159 instead of a post button, or the like, the data will be saved to the data store 140 even though there may be errors.

Figure 1C:
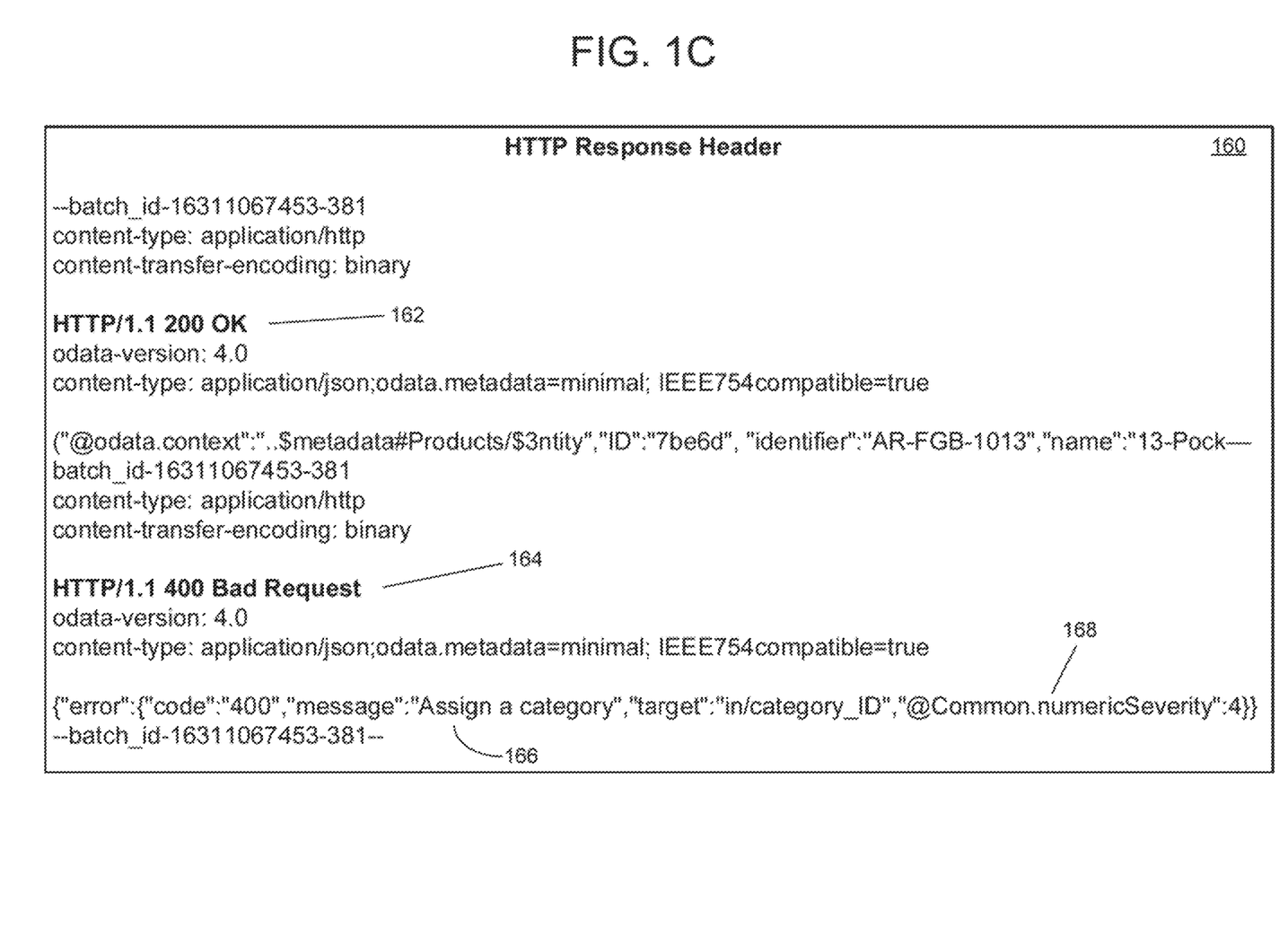
FIG. 1C is a diagram illustrating HTTP messages between the application and the OData service in accordance with an example embodiment.

FIG. 1C illustrates an HTTP response header 160 from the OData service 132 to the application 120 in accordance with an example embodiment. Referring to FIG. 1C, the OData service 132 may generate an HTTP response with an HTTP response header 160 that includes notifications of both a successfully processed part 162 and an unsuccessfully processed part 164. Here, the HTTP response header 160 also includes metadata 166 that provides information about an error that occurred. However, the metadata 166 is not legible to a human. In this example, the HTTP response may be extended using a @common.numericSeverity instance annotation value that can be added to the HTTP response header 160. The @common.numericSeverity instance annotation is a value that is used to identify a severity of the message and/or a type of message. For example, a value of '1' may indicate that the message is a success message/notification, a value of '2' may indicate that the message is an information message/notification, a value of '3' may indicate that the message is a warning message/notification, and a value of '4' may indicate that the message is an error message/notification.

When the application 120 receives the HTTP response including the HTTP response header 160 from the OData service 132, the application 120 will not know how to address the unsuccessfully processed part 164 of the HTTP response. That is, OData protocol does not provide a mechanism for interpreting an HTTP response that includes both successes and errors. Therefore, the application 120 will not provide any information about the unsuccessfully processed part 164 of the HTTP request 124 to the user.

Figure 2:
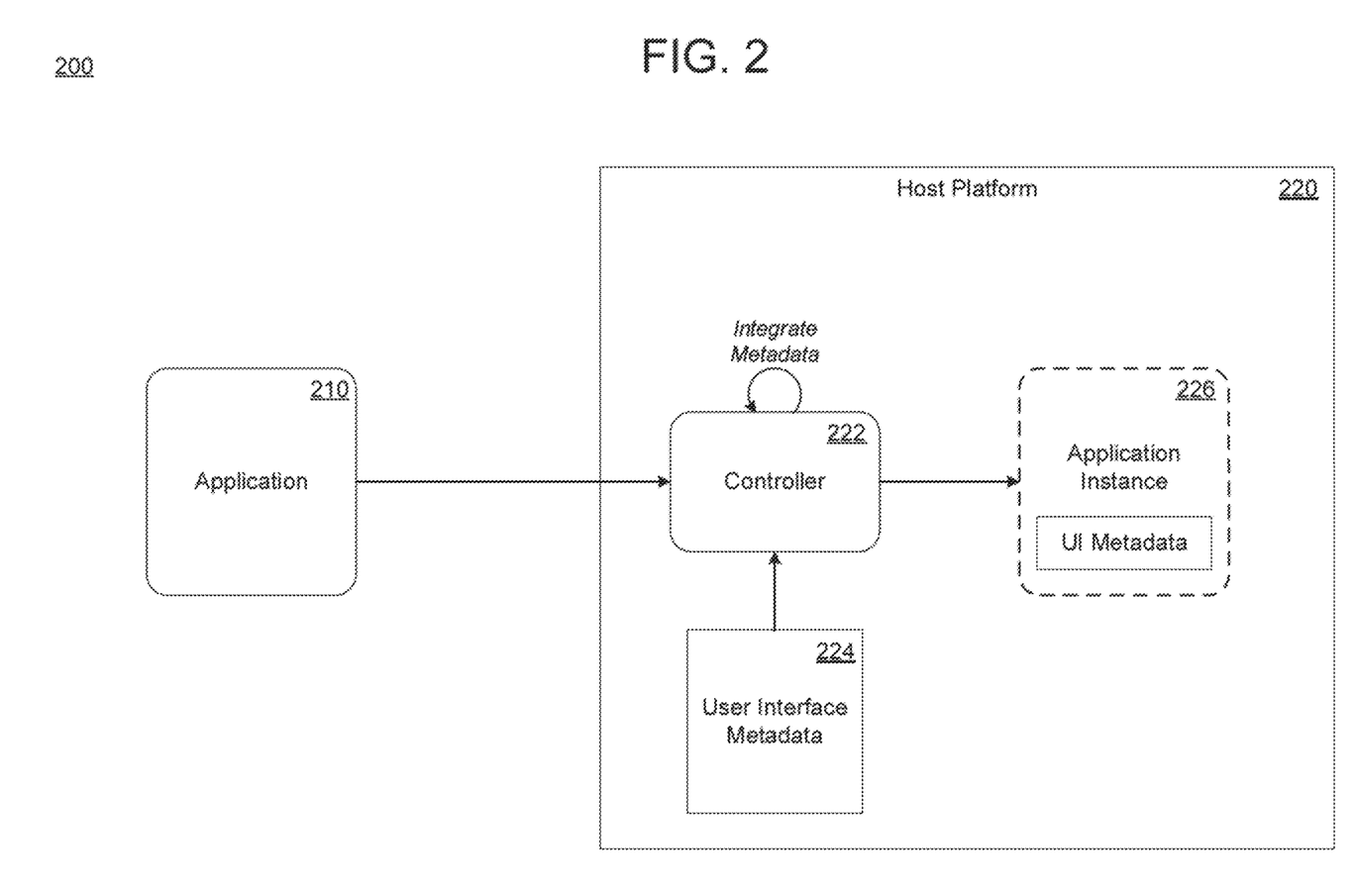
FIG. 2 is a diagram illustrating a process of deploying an application on a host platform in accordance with an example embodiment.

FIG. 2 illustrates a process 200 of deploying an application 210 on a host platform 220 in accordance with an example embodiment. Referring to FIG. 2, the host platform 220 may include a cloud platform, a web server, a database, an on-premises server, or the like. Here, the application 210 may be developed using a programming language and then compiled and deployed on the host platform 220. In this example, the compiling may be performed by a developer or it may be performed by the host platform 220. In the example of FIG. 2, the compiling is performed by a controller 222 of the host platform. During the compiling, the controller 222 may integrate files of user interface metadata 224 for OData services into an instance of the application (application instance 226) that is installed and then launched/deployed and running on the host platform 220.

In the example embodiments, the user interface metadata 224 may include data model information for the OData services such as described herein, including entities, relationships, entity sets, actions, and functions of the OData services. The application instance 226 may follow the same data model. In addition, the user interface metadata 224 may include identifiers of user interface elements (e.g., text box input fields, drop-down menus, radio buttons, checkboxes, etc.) of the user interface for communication between the application instance 226 and the OData service.

According to various embodiments, the deployed application (such as application instance 226 shown in FIG. 2), can communicate with OData services and provide a user with information that has not previously been provided by other OData technologies. In the example embodiments, requests sent from an application to an OData service that are processed successfully in part, but also with errors or other issues, may be handled in a new way. In particular, an identifier of the user interface element that is associated with the error can be provided along with a human-readable description of a reason for the error. This information can be provided to the application thereby enabling the application to identify a corresponding element on the screen/user interface and display the reason in association therewith.

Figure 3A:
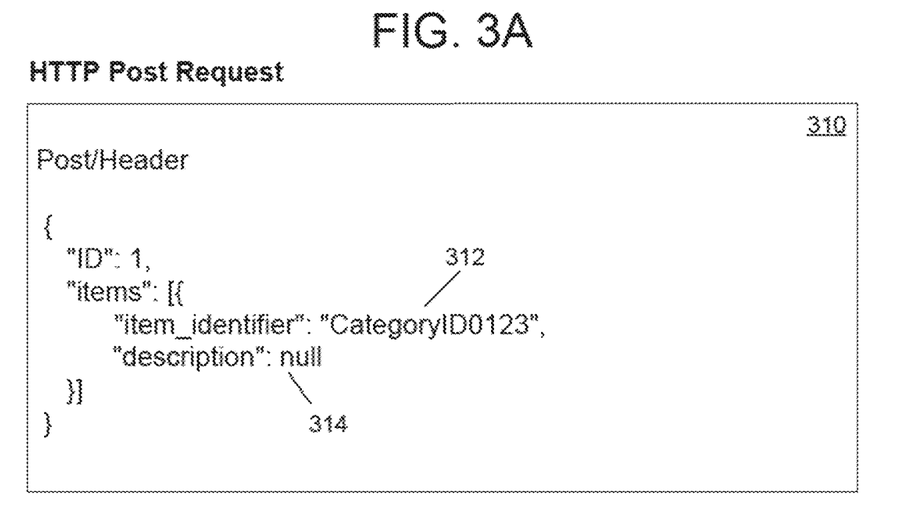
FIGS. 3A and 3B are diagrams illustrating examples of HTTP messages with error target data in accordance with an example embodiment.
Figure 3B:
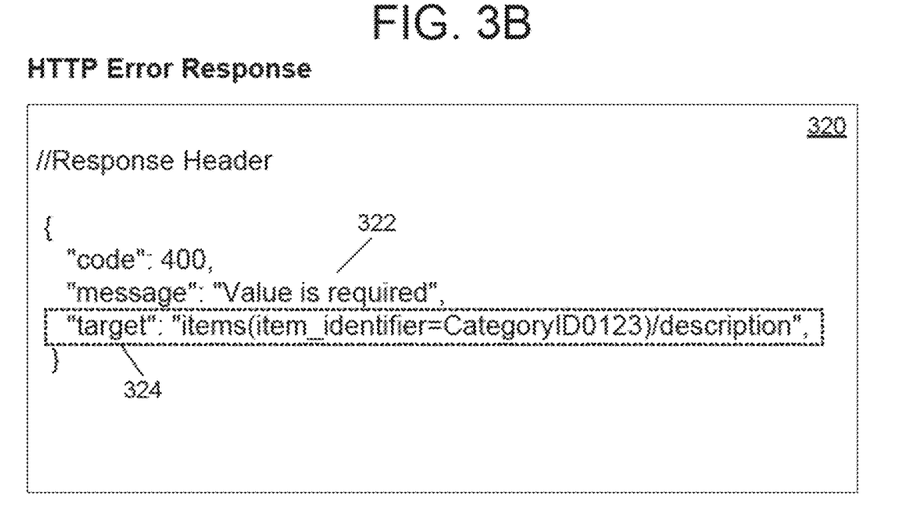

FIGS. 3A and 3B illustrate examples of HTTP messages with error target data in accordance with an example embodiment. Referring to FIG. 3A, an HTTP request message includes an HTTP request header 310. For example, the HTTP request header 310 may be included within a HTTP request from the application 120 to the OData service 132 shown in FIG. 1A. As an example, the request may be a PUT request to store data from the user interface 150 shown in FIG. 1B to the data store 140 via the OData service 132. In this example, the HTTP request header 310 includes a unique identifier 312 of the user interface element where the value is to be added. In this example, the user interface element includes an ID of "CategoryID0123". However, it should be appreciated that the unique identifier may be a global unique identifier (GUID) GUID, such as a 128-bit GUID or the like which is commonly used in databases. The HTTP request header 310 may also include a value field 314 that includes the value to be added in the field of the target user interface element. Here, the value is null because there is nothing in the text input field of the Category input field 157 shown in FIG. 1B. In FIG. 3A, an item identifier 312 of the Category input field 157 of FIG. 1B is shown along with a value field 314 for the item. However, it should be appreciated that the HTTP request may also include identifiers of other user interface elements (e.g., any of fields 151-156 and 158 shown in FIG. 1B, etc.) and values stored therein, as well. For simplicity, these other lines have been removed.

The HTTP request may be sent from the application 120 to the OData service 132. In response, the OData service 132 may process the data request. In this case, the OData service may be able to perform some of the requests, for example, for input fields 151-156, and 158. However, the OData service 132 may not be able to perform the request for the Category input field 157 which results in an error because this field is mandatory and has been left blank.

In this case, the OData service may generate an HTTP response that includes a response header 320 such as shown in FIG. 3B and which includes a target identifier 324 of user interface element where the error occurred, and a description 322 of the error. The target identifier 324 may identify a user interface element among other elements on a page within the application, and it may also identify a page location among a plurality of pages. Examples of a target identifier 324 include a GUID, but embodiments are not limited thereto. The target identifier 324 may identify a page location of the UI element from among a plurality of application pages, and a UI element from among other UI elements within a single page of the application. Furthermore, the description 322 may include human-readable text description of the reason for the error. Here, the OData service can forward the HTTP response to the application, including the target identifier 324 and the description 322.

Figure 3C:
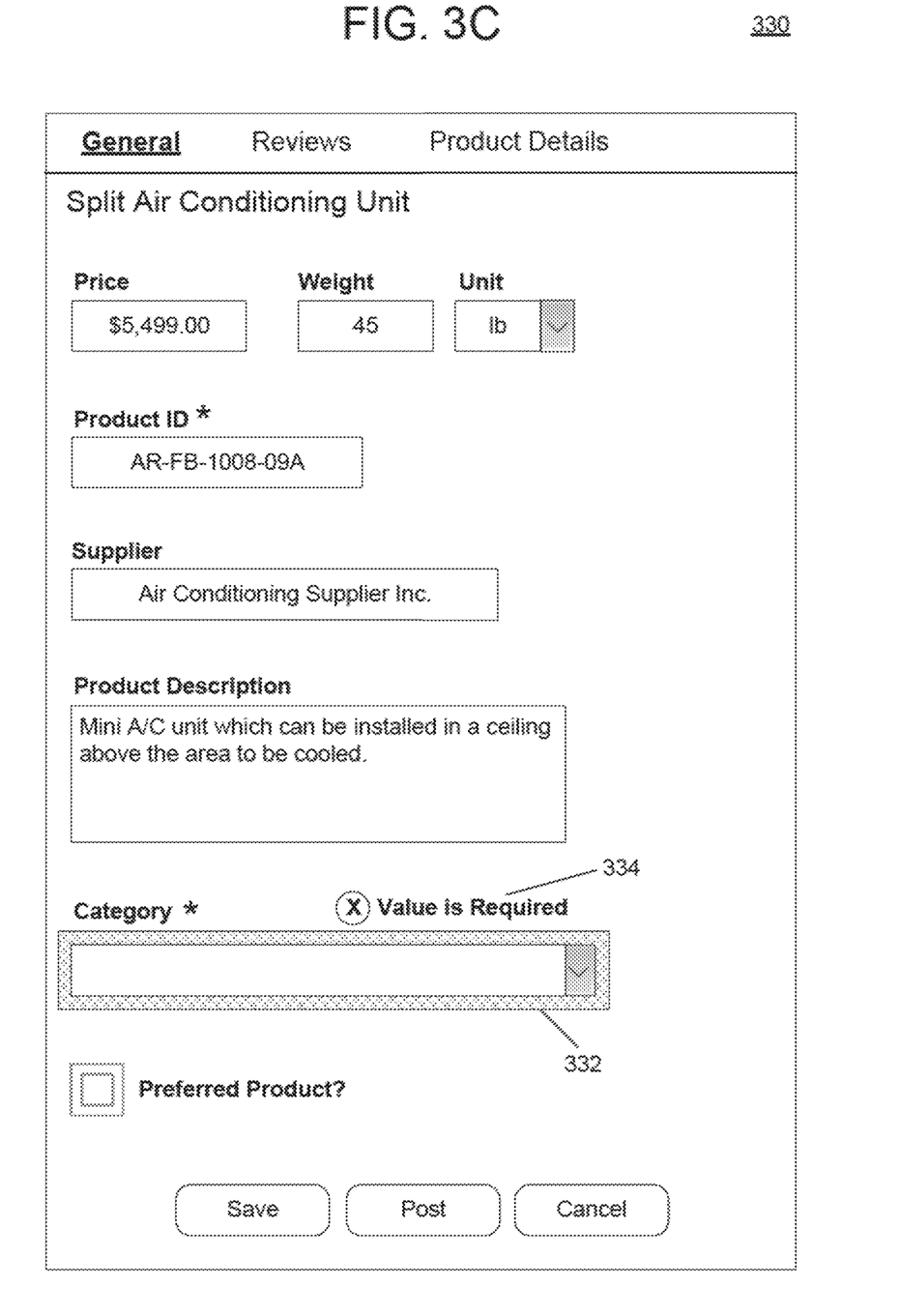
FIG. 3C is a diagram illustrating a user interface displaying an error notification, in accordance with an example embodiment.

Because of the additional information, the application can provide the user with information that was not possible before. For example, FIG. 3C illustrates a user interface 330 displaying an error notification, in accordance with an example embodiment. Referring to FIG. 3C, the user interface 330 corresponds to the user interface 150 shown in FIG. 1B. However, in this example, a box 332 has been displayed around the Category input field 157. Here, the box 332 highlights the Category input field 157 using a different color or shading. The user interface 330 also includes an error description 334 describing the reason for the error and including the human-readable text from the description 322 in the response header 320 of FIG. 3B.

Figure 4:
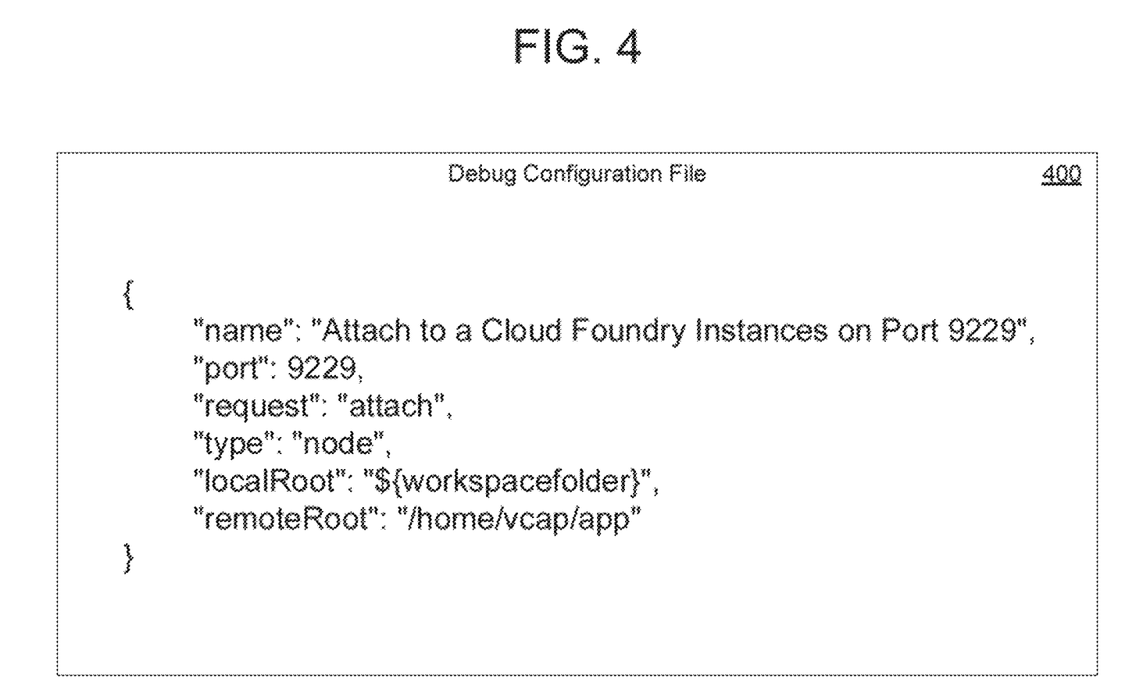
FIG. 4 is a diagram illustrating a computing system for use in the embodiments that are described herein.

FIG. 4 is a diagram of a server node 400 according to some embodiments. The server node 400 may include a general-purpose computing apparatus and may execute program code to perform any of the functions described herein. The server node 400 may comprise an implementation of a host platform, in some embodiments. It should also be appreciated that the server node 400 may include other unshown elements according to some embodiments and may not include all of the elements shown in FIG. 4.

Server node 400 includes processing unit(s) 410 (i.e., processors) operatively coupled to communication device 420, data storage device 430, input device(s) 440, output device(s) 450, and memory 460. Communication device 420 may facilitate communication with external devices, such as an external network or a data storage device. Input device(s) 440 may comprise, for example, a keyboard, a keypad, a mouse or other pointing device, a microphone, knob or a switch, an infra-red (IR) port, a docking station, and/or a touch screen. Input device(s) 440 may be used, for example, to enter information into the server node 400. Output device(s) 450 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), optical storage devices, Read Only Memory (ROM) devices, etc., while memory 460 may comprise Random Access Memory (RAM). In some embodiments, the data storage device 430 may store user interface elements in tabular form. For example, one or more columns and one or more rows of user interface elements may be displayed in a two-dimensional spreadsheet, table, document, digital structure, or the like.

Application server 431 and query processor 432 may each comprise program code executed by processing unit(s) 410 to cause server node 400 to perform any one or more of the processes described herein. Such processes may include estimating selectivities of queries on tables 434 based on statistics 433. Embodiments are not limited to execution of these processes by a single computing device. Data storage device 430 may also store data and other program code for providing additional functionality and/or which are necessary for operation of server node 400, such as device drivers, operating system files, etc.

Figure 5:
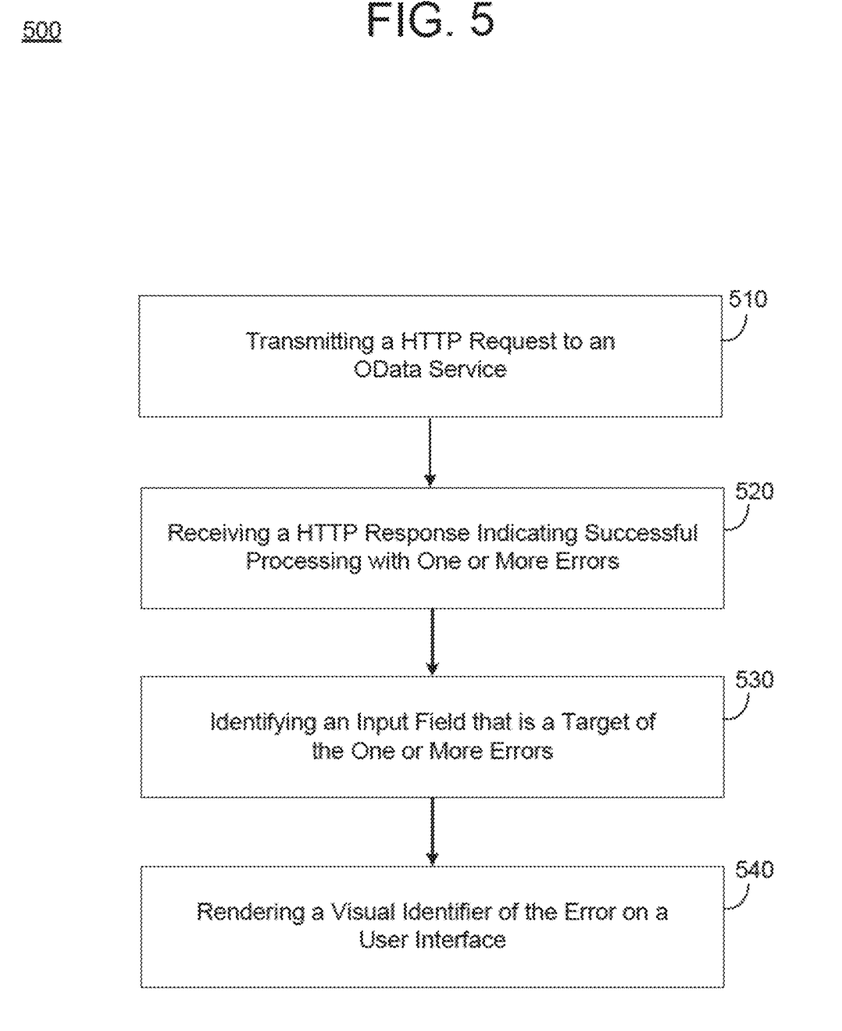
FIG. 5 is a diagram illustrating a method of displaying an error that occurs during processing of an OData request, in accordance with an example embodiment.

FIG. 5 illustrates a method 500 of displaying an error that occurs during processing of an OData request, in accordance with an example embodiment. As an example, the method 500 may be performed by a web server, a cloud platform, an on-premises server, a database node included within a distributed database system, a user device, and the like. Referring to FIG. 5, in 510, the method may include transmitting, via an application, a hypertext transfer protocol (HTTP) request to an Open Data Protocol (OData) service, the HTTP request comprising identifiers of one or more input fields displayed on a user interface and one or more values for the one or more input fields. The HTTP request may be submitted from an HTTP-based application that is interacting with the OData service via the Internet.

In 520, the method may include receiving, from the OData service, an HTTP response indicating that the HTTP request was processed successfully with one or more errors. In 530, the method may include identifying an input field from among the one or more input fields which is a target of the error and a reason for the error from a field in the HTTP response indicating that the HTTP request was processed successfully with one or more errors. In 540, the method may include rendering, via the application, a visual identifier of the error in association with a display of the input field on the user interface.

In some embodiments, the transmitting may include identifying names of the one or more input fields from a data model of the OData service, and transmitting the names in the HTTP request. In some embodiments, the HTTP response may include a target identifier field in an HTTP response header, and the target identifier field includes an identifier of the input field and a description of the error. In some embodiments, the rendering may include displaying a box around the input field with one or more of a distinguishing color and a distinguishing shading with respect to an application background.

In some embodiments, the rendering may include displaying a message that describes the reasons for the error adjacent to the input field on the user interface. In some embodiments, the HTTP response may include a format that is compatible with OData Version 4.0 or higher. In some embodiments, the field in the HTTP response may include a relative resource path to the input field in the application, and the rendering is performed based on the relative resource path. In some embodiments, the field of the HTTP response may include an i18N name of the input field and a human-readable text description of the error.

Figure 6:
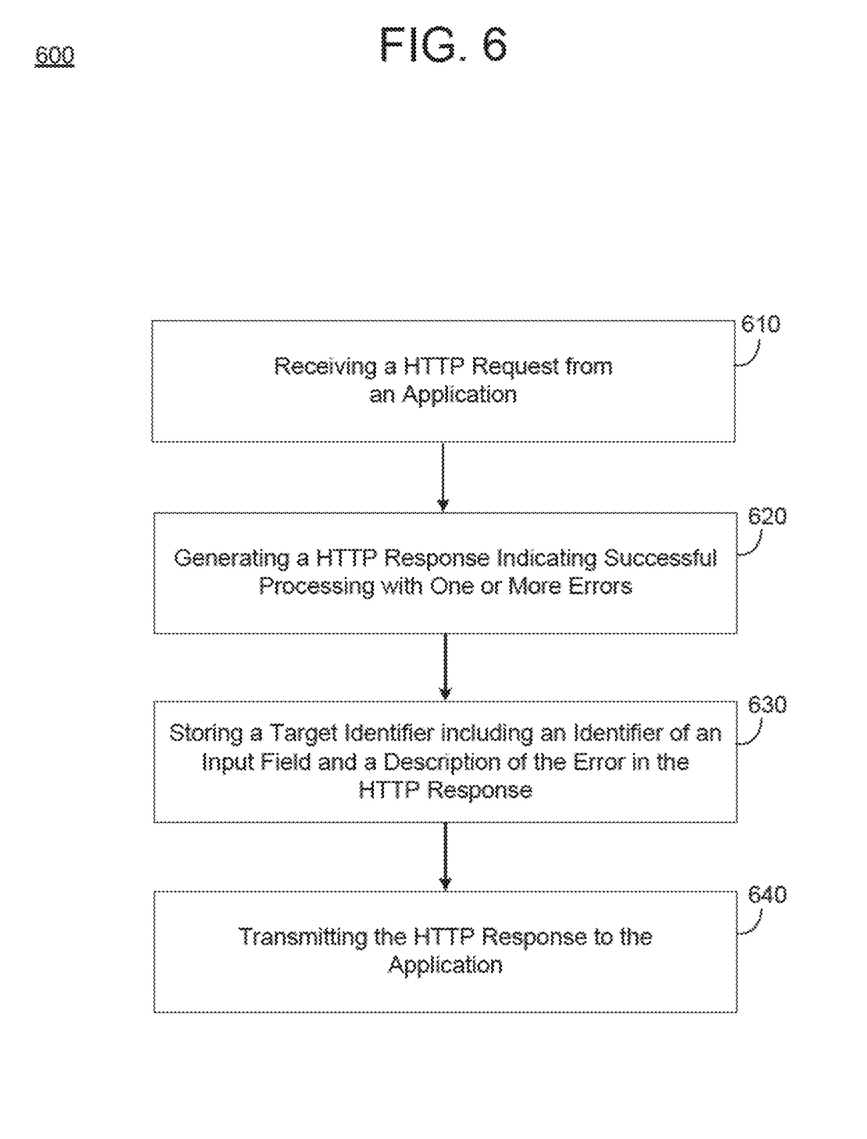
FIG. 6 is a diagram illustrating a method of generating a HTTP response with error target information in accordance with an example embodiment Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

FIG. 6 illustrates a method 600 of generating an HTTP response with error target information in accordance with an example embodiment. As an example, the method 600 may be performed by a web server, a cloud platform, an on-premises server, a database node included within a distributed database system, a user device, and the like. Referring to FIG. 6, in 610, the method may include receiving, via an Open Data Protocol (OData) service, a hypertext transfer protocol (HTTP) request from an application, the HTTP request comprising identifiers of one or more input fields displayed on a user interface and one or more values for the one or more input fields. For example, the HTTP request may identify an input field by its unique identifier defined by the metadata document of the runtime and a value for the input field.

In 620, the method may include generating, via the OData service, an HTTP response indicating that the HTTP request was processed successfully with one or more errors. In 630, the method may include storing a target identifier in the HTTP response which identifies an input field from among the one or more input fields which is a target of the error and a reason for the error. In 640, the method may include transmitting the HTTP response to the application which includes information indicating the HTTP request was processed successfully with one or more errors and which includes the target identifier.

In some embodiments, the receiving may include receiving an identifier of the input field and a data value for the input field via the HTTP request. In some embodiments, the storing may include storing an identifier of the input field and a description of the error in a target identifier field of the HTTP response header. In some embodiments, the HTTP response may include a format that is compatible with OData Version 4.0 or higher.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
 a processor configured to
  transmit, from an application, a hypertext transfer protocol (HTTP) request to an Open Data Protocol (OData) service, the HTTP request comprising identifiers of one or more input fields displayed on a user interface and one or more values for the one or more input fields,
  receive, from the OData service, an HTTP response indicating that the HTTP request was processed successfully with one or more errors,
  identify an input field from among the one or more input fields which is a target of the error and a description of the error from a field included in a header of the HTTP response, and
  render, via the application, a display of the description of the error included in the header of the HTTP response in association with the target input field on the user interface.

2. The computing system of claim 1, wherein the processor is configured to identify names of the one or more input fields from a data model of the OData service, and transmit the names in the HTTP request.

3. The computing system of claim 1, wherein the header of the HTTP response comprises a target identifier field that includes an identifier of the input field and a human-readable description of the error.

4. The computing system of claim 1, wherein the processor is configured to display a box around the input field with one or more of a distinguishing color and a distinguishing shading with respect to an application background.

5. The computing system of claim 1, wherein the processor is configured to display a message that includes the description of the error adjacent to the input field on the user interface.

6. The computing system of claim 1, wherein the HTTP response comprises a format that is compatible with OData Version 4.0 or higher.

7. The computing system of claim 1, wherein the field in the HTTP response comprises a relative resource path to the input field in the application, and the processor is configured to render the visual identifier based on the relative resource path.

8. The computing system of claim 1, wherein the field of the HTTP response comprises an i18N name of the input field and a human-readable text description of the error.

9. A method comprising:
 transmitting, via an application, a hypertext transfer protocol (HTTP) request to an Open Data Protocol (OData) service, the HTTP request comprising identifiers of one or more input fields displayed on a user interface and one or more values for the one or more input fields;
 receiving, from the OData service, an HTTP response indicating that the HTTP request was processed successfully with one or more errors;
 identifying an input field from among the one or more input fields which is a target of the error and a description of the error from a field included in a header of the HTTP response; and
 rendering, via the application, a display of the description of the error included in the header of the HTTP response in association with the target input field on the user interface.

10. The method of claim 9, wherein the transmitting comprises identifying names of the one or more input fields from a data model of the OData service, and transmitting the names in the HTTP request.

11. The method of claim 9, wherein the header of the HTTP response comprises a target identifier that includes an identifier of the input field and a human-readable description of the error.

12. The method of claim 9, wherein the rendering comprises displaying a box around the input field with one or more of a distinguishing color and a distinguishing shading with respect to an application background.

13. The method of claim 9, wherein the rendering comprises displaying a message that includes the description of the error adjacent to the input field on the user interface.

14. The method of claim 9, wherein the HTTP response comprises a format that is compatible with OData Version 4.0 or higher.

15. The method of claim 9, wherein the field in the HTTP response comprises a relative resource path to the input field in the application, and the rendering is performed based on the relative resource path.

16. The method of claim 9, wherein the field of the HTTP response comprises an i18N name of the input field and a human-readable text description of the error.

17. A method comprising:
   receiving, via an Open Data Protocol (OData) service, a hypertext transfer protocol (HTTP) request from an application, the HTTP request comprising identifiers of one or more input fields displayed on a user interface and one or more values for the one or more input fields;
   generating, via the OData service, an HTTP response indicating that the HTTP request was processed successfully with one or more errors;
   storing a target identifier in a response header of the HTTP response which identifies an input field from among the one or more input fields which is a target of the error and a description of the error; and
   transmitting the HTTP response to the application which includes information indicating the HTTP request was processed successfully with one or more errors and which includes the target identifier.

18. The method of claim 17, wherein receiving comprises receiving an identifier of the input field and a data value for the input field via the HTTP request.

19. The method of claim 17, wherein the storing comprises storing an identifier of the input field and a description of the error in a target identifier field of the response header.

20. The method of claim 17, wherein the HTTP response comprises a format that is compatible with OData Version 4.0 or higher.

* * * * *